Figure 1:
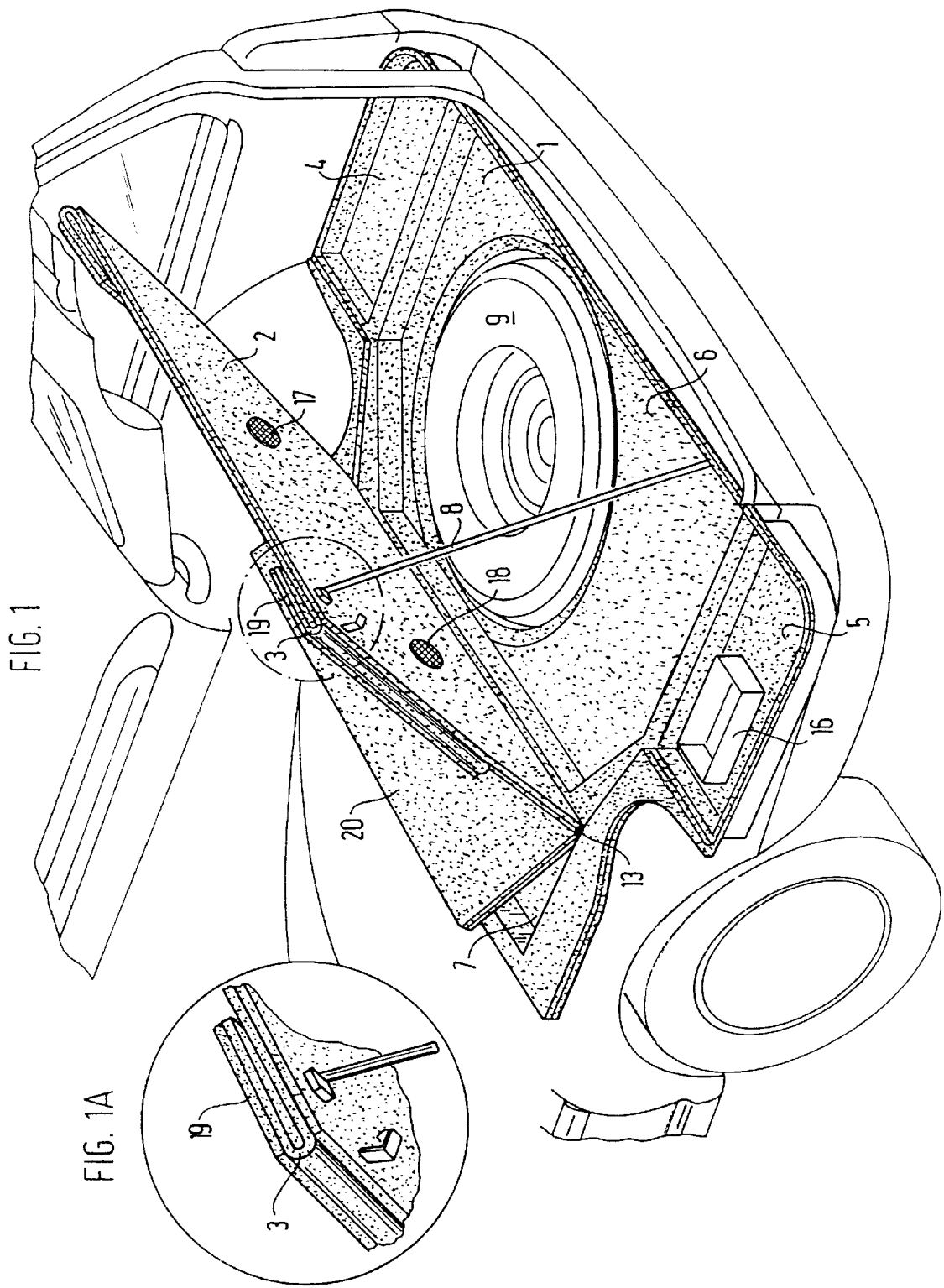

United States Patent
Valentin et al.

[19]

[11] Patent Number: 5,979,962
[45] Date of Patent: *Nov. 9, 1999

[54] LOAD FLOOR LINING HAVING INTEGRATED SOUND INSULATION

[75] Inventors: Erhard Valentin, Adelheidsdorf; Hans Walendy, Wathlingen; Hans Kutter-Schrader, Isernhagen, all of Germany

[73] Assignee: Stankiewicz GmbH, Adelheidsdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,670

[22] PCT Filed: Jun. 9, 1995

[86] PCT No.: PCT/EP95/02224

§ 371 Date: Feb. 28, 1997

§ 102(e) Date: Feb. 28, 1997

[87] PCT Pub. No.: WO95/34446

PCT Pub. Date: Dec. 12, 1995

[30] Foreign Application Priority Data

Jun. 10, 1994 [DE] Germany .............................. 44 20 439

[51] Int. Cl.⁶ ........................................................ B60R 7/00
[52] U.S. Cl. ......................... 296/37.1; 296/39.3; 221/542
[58] Field of Search ................................ 296/37.2, 37.3, 296/37.16, 39.1, 39.3, 39.2, 37.1, 24.1, 370.14; 224/42.13, 539, 542, 540, 541

[56] References Cited

U.S. PATENT DOCUMENTS

| | | | |
|---|---|---|---|
| 2,784,027 | 3/1957 | Temp .................................... | 296/26.09 |
| 4,153,815 | 5/1979 | Chaplin et al. .......................... | 179/1 P |
| 4,351,555 | 9/1982 | Hashimoto ............................. | 296/37.16 |
| 4,417,098 | 11/1983 | Chaplin et al. ........................... | 381/94 |
| 4,490,841 | 12/1984 | Chaplin et al. ........................... | 381/71 |
| 4,506,380 | 3/1985 | Matsui ..................................... | 381/71 |
| 4,801,169 | 1/1989 | Queen et al. ........................... | 296/39.1 |
| 5,080,417 | 1/1992 | Kanai ..................................... | 296/37.3 |
| 5,167,433 | 12/1992 | Ryan ...................................... | 296/37.1 |
| 5,245,141 | 9/1993 | Fortez et al. ............................ | 181/288 |
| 5,329,979 | 7/1994 | Miller et al. ........................... | 296/24.1 |
| 5,568,890 | 10/1996 | Magee et al. ....................... | 224/542 X |
| 5,667,115 | 9/1997 | Verhaeg .............................. | 224/542 X |

FOREIGN PATENT DOCUMENTS

| | | | |
|---|---|---|---|
| 0098594 | 1/1984 | European Pat. Off. ............. | 296/39.3 |
| 270 097 | 6/1988 | European Pat. Off. . | |
| 287 941 | 10/1988 | European Pat. Off. . | |
| 2534204 | 4/1984 | France ................................... | 224/539 |
| 2933130 | 3/1981 | Germany ............................. | 296/37.1 |
| 3106029 | 9/1982 | Germany ............................. | 296/36.3 |
| 36 739 | 3/1983 | Japan .................................... | 296/39.3 |
| 358221736 | 12/1983 | Japan .................................... | 224/539 |
| 0183900 | 9/1985 | Japan .................................... | 296/39.3 |
| 2 229 982 | 10/1990 | United Kingdom . | |
| WO 88/08379 | 11/1988 | WIPO . | |

*Primary Examiner*—Dennis H. Pedder
*Attorney, Agent, or Firm*—Marshall, O'Toole, Gerstein, Murray & Borun

[57] ABSTRACT

There is provided a one-piece, removable load floor lining having sound insulation properties, for motor vehicles, having an upper shell (2) and a lower shell (1). The upper shell (2) is substantially flat and is hingeably connected with the lower shell (1) which is adapted to the contours of the trunk region, so that a complete unit is obtained which because of the double-wall principle achieves a large acoustic effect. The upper shell (2) further includes coverings (19, 20) which can be folded open by means of hinge means, whereby together with the contour-following configuration of the lower shell (1) there are provided closed hollow spaces (4, 5, 6, 7) of different depths, in particular as storage compartments for receiving accessory parts, baggage or the like, such as e.g. a so-called active noise control system.

17 Claims, 4 Drawing Sheets

LOAD FLOOR LINING HAVING INTEGRATED SOUND INSULATION

The invention relates to a shaped part for load floor lining, in particular for motor vehicles, in particular for station wagons, having integrated sound insulation properties, which can be fitted into the vehicle as a complete unit and, upon later vehicle recycling, can be removed likewise as a complete unit.

From German Utility Model No. 73 40 373 there is known a shaped lining part for trunks which consists of a plastics layer which is applied to a felt material. This felt material should be characterized by a high flexibility and compressibility, so that together with the plastics layer—which for example may be a light polyethylene foil—a wrinkle-free and easily effected shaping process, with e.g. the aid of vacuum pressure, is possible. However, no indication is given with regard to how a shaped part is to be configured for trunks, and what criteria it must meet in order to improve noise comfort in particular in the passenger cabins of station wagons.

European Patent Application 0 474 593 A1 describes a sound insulating and sound damping composite member which can be employed for lining trunks. This sound insulating and sound damping composite member consists of an insulation covering which lies loosely on the floor part and is provided on the rear side with variously configured channels. By means of the structure of the channels, taken together with the floor part, it is intended to achieve an anisotropic air flow resistance, so that the lateral air flow resistance, running in the direction of the plane of the laid member, is smaller than the transverse air flow resistance, running in the thickness direction. The acoustic effect is indicated on the basis of measured data. For example in FIG. 3 of that application, there is illustrated the frequency dependent form of the sound insulation effect for a so-called classical sound insulation system in comparison with the sound insulation effect of the proposed arrangement. The system configuration in accordance with European Patent Application 0 474 593 A1 is very complicated, is thereby complex in manufacture and is relatively expensive and—because of its geometric configuration—in no way makes possible the exploitation of contour depressions or indentations in the load space floor as storage space or for accommodating electronic component elements. As can be seen from the measurement curves illustrated in FIG. 3 of that application, the sound insulating and sound damping effect of this system is not sufficiently effective in all frequency ranges.

The object of the present invention is, therefore, to provide an overall load floor lining for motor vehicles, in particular station wagons having large rear load floors, which with simple construction provides high acoustic effectiveness over the whole frequency range even in the case of an empty or only partially occupied load floor.

The above object is achieved by means of the features of claim 1. The subclaims indicate advantageous further developments of the inventive concept.

Thus, in accordance with the invention, there is provided a one-piece removable load floor lining configuration, consisting of an upper and a lower shell, whereby the upper shell may contain a plurality of lids or flaps—which may be divided—and the lower shell covers over the entire available surface. The upper shell is connected with the lower shell in a hinged manner. The region above the spare wheel can be formed as a flap or lid with an opening in the vehicle direction, and as a divided flap or lid having a double-wing hinging in the direction of the vehicle longitudinal axis. By these means, the accessability to storage compartments is improved, when for example the load floor is not completely occupied by a load.

Hollow spaces of the load floor, predetermined structurally, are employed as storage compartments for various purposes, inter alia for accommodating electronic components which previously have been accommodated with relatively poor accessibility either in the engine compartment or in the passenger compartment. The accessibility of such components is significantly facilitated through their accommodation in the load space or trunk, in particular for servicing purposes. Because of the structural configuration, which provides storage compartments with coverings which are able to be opened, there is provided a smooth, plane load floor. In the case of predetermined configuration of the load floor lining, this can be taken into consideration in the construction of the vehicle in order in this way to achieve the best possible exploitation of available space in each case.

Despite the striven—for light weight of the load floor lining, a significantly improved acoustic effectiveness is attained in comparison with the state of the art even in the low frequency region which is effected by the ignition frequency. This can be attained by means of the employment of so-called "active noise control" of which the control unit is accommodated as electronic component in one of the storage compartments and which from there is connected by way of suitably configured connections with the associated microphones and the loudspeakers.

For the manufacture of the load floor lining, thermally moldable mixed non-woven fabrics are proposed.

Good sound insulation is brought about through double-wall effects which arise through moldings of the lower shell in co-operation with the upper shell and the upper-side coverings. Additionally, the hollow spaces are provided with coverings which absorb airborne sounds.

For active noise control, as a rule 4 to 6 microphones are provided which are either integrated into the load floor lining or can be separately connected by way of plug-in connections to the control unit, so that—adapted to the type of vehicle through selected positioning, e.g. bound in peripheral covering parts—a large acoustic effectiveness can be attained in the low frequency range. As loudspeakers, the on-board loudspeakers are employed, if appropriate together with additionally installed units.

The advantages attainable by means of the invention reside in the complete use of the space of the load area. Through the provision of storage compartments, possibilities for accommodating electronic components are be provided which otherwise are poorly accessibly located, e.g. under the carpet in the passenger compartment. The sound insulation of the load floor lining is, in comparison with the state of the art, significantly improved despite simple constructional configuration.

Exemplary embodiments of the invention and their acoustic effectiveness will be described below with reference to examples. There is shown:

FIG. 1 an overall view of a load floor lining in accordance with the invention

FIG. 1A a detail of FIG. 1

Figure 2:
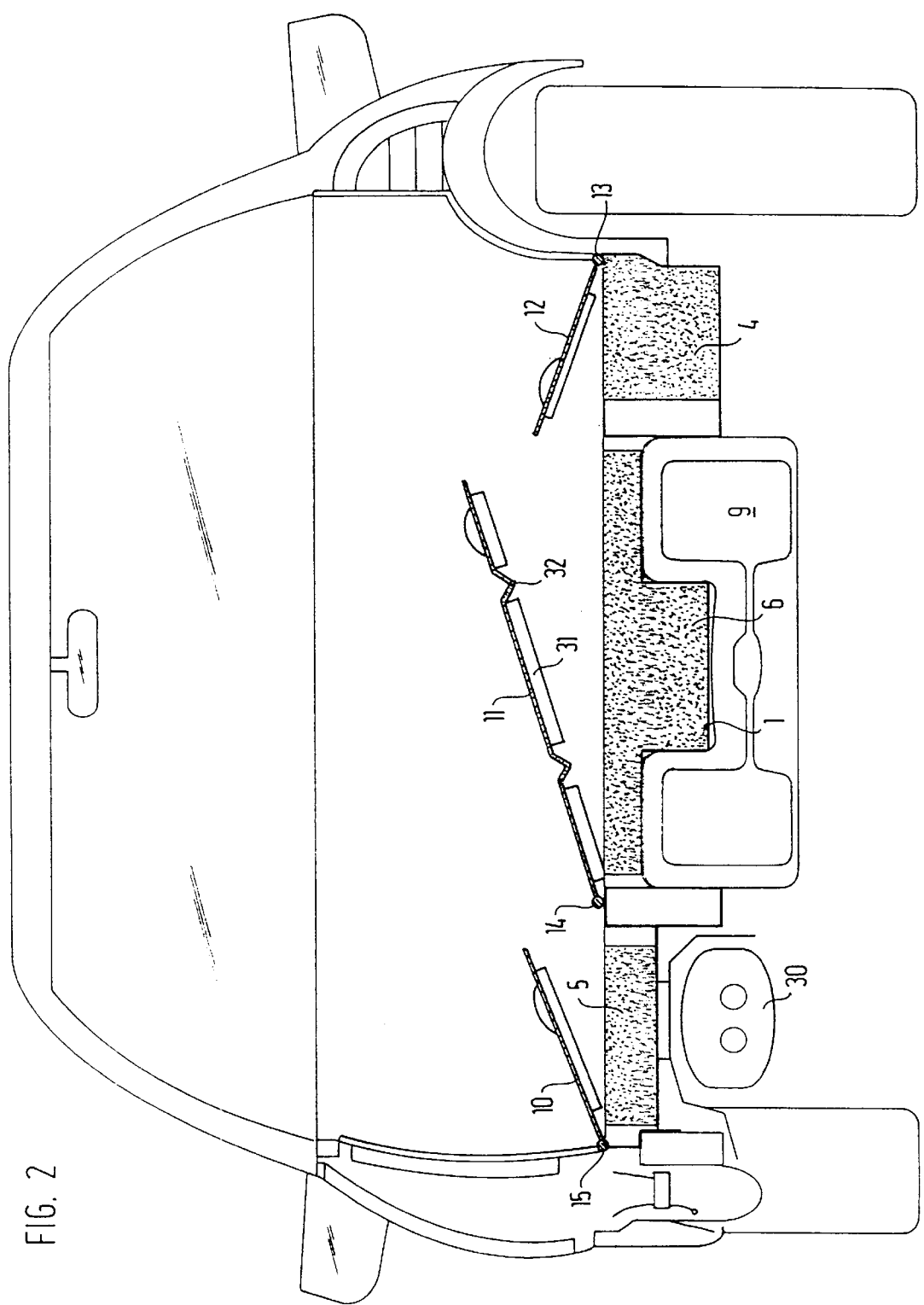

FIG. 2 a sectional illustration having a modified flap or lid configuration

Figure 3:
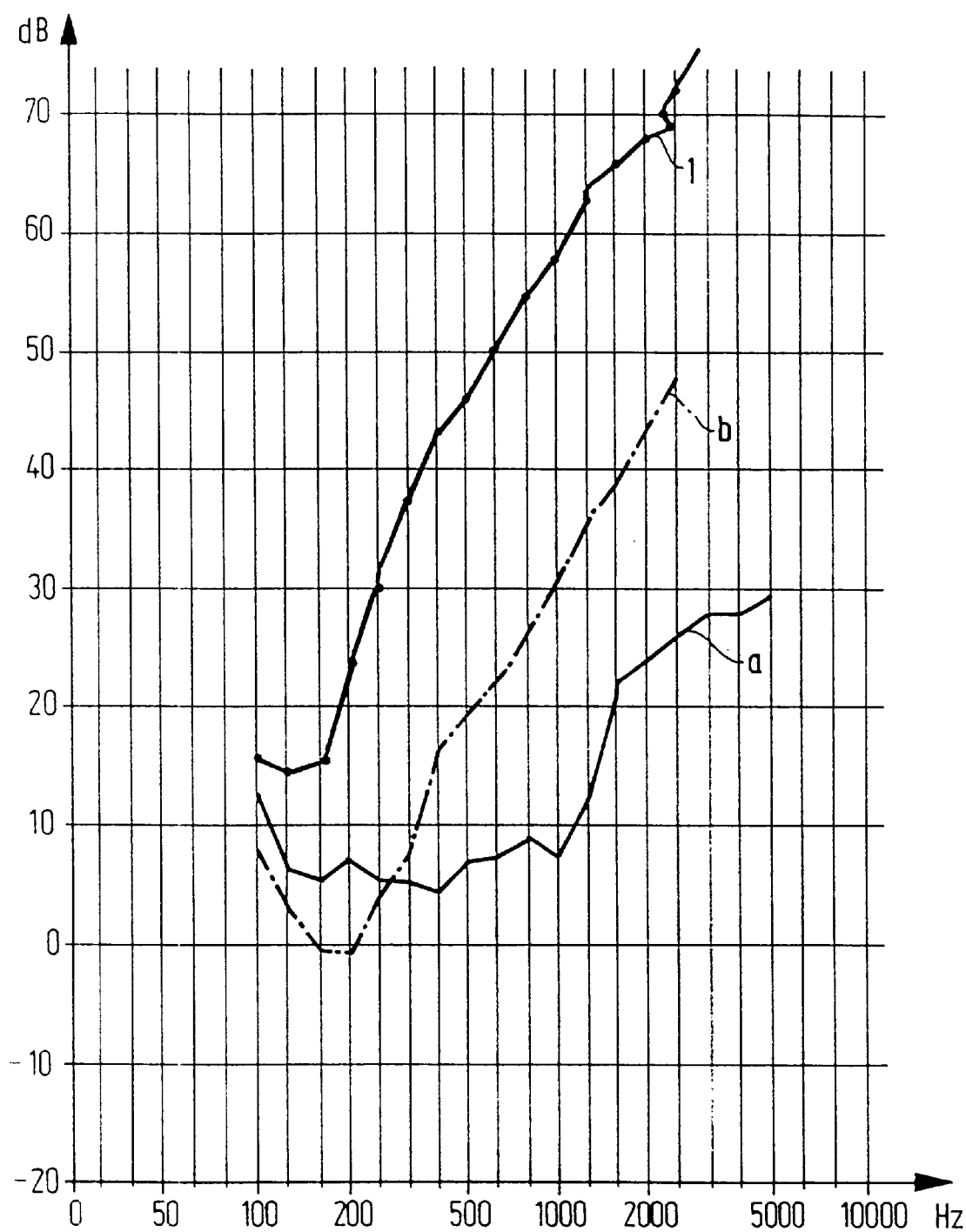

FIG. 3 a graphical representation of the sound damping as a function of frequency.

Figure 4:
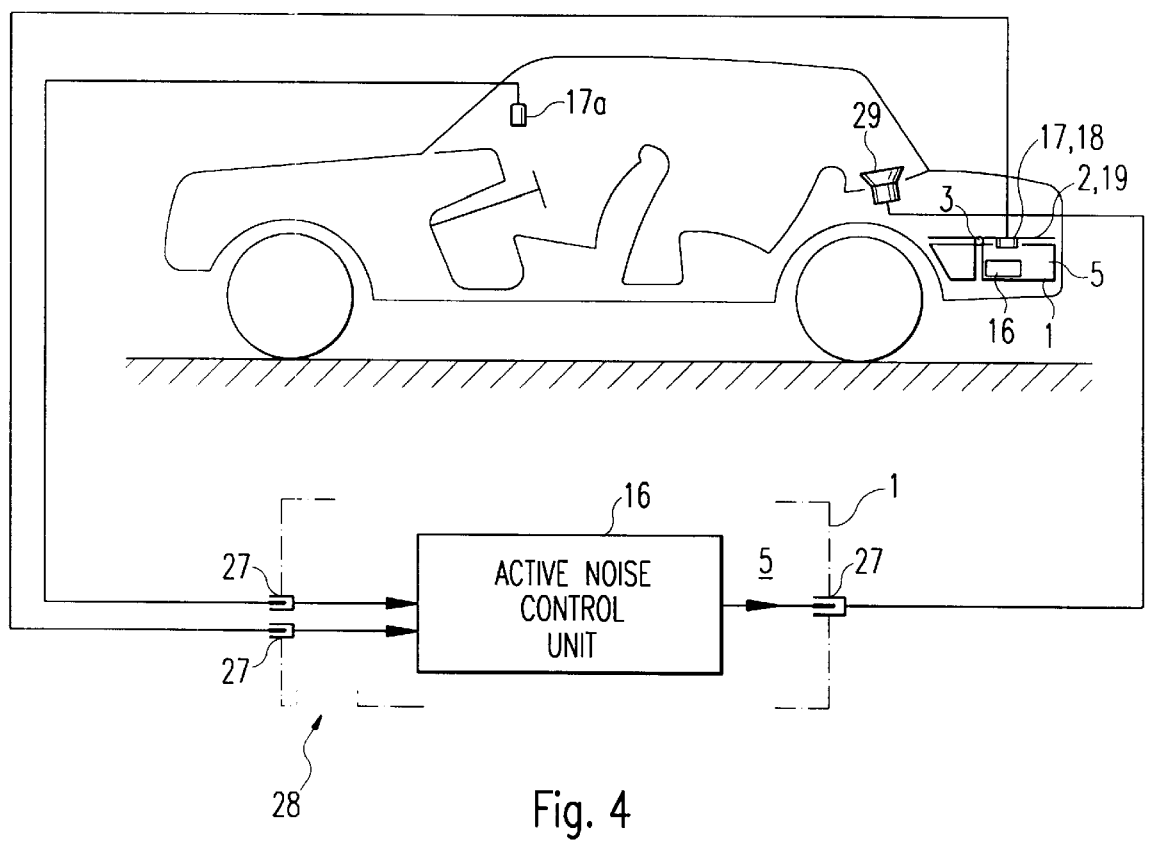

FIG. 4 is a schematic illustration of a load floor lining including active noise control in accordance with a preferred embodiment of the present invention.

From FIG. 1 the arrangement of the load floor lining having integrated sound insulation in the rear region of a station wagon is made clear, whereby this is only one possible variant, which is determined by the construction of the vehicle. The one-piece lower shell 1 contains contour-following indentations for storage compartments 4, 5, 6 and 7, with the spare wheel 9 being exposed.

The upper shell 2 is supported by means of an opening retainer 8 and contains the cover flaps or lids 19 and 20 and the necessary hinging 3. Likewise, the microphones 17 and 18 which are connected with the electronic control unit for active noise control 16 can be accommodated here. The control unit 16 is provided with cooling means, if appropriate in combination with openings in storage compartment 5, in order to make possible the necessary cooling for the power amplifier. From the lower shell 1 or the storage compartment 5, plug-in connections for the necessary loudspeaker terminals are brought out.

As base material for the lower shell 1 there are employed the thermally moldable non-woven fabrics known to the skilled person, such as e.g. polyester, polypropylene and e.g. also two-component fibers. The choice of the non-woven fabrics is not restricted to the types just mentioned. Rather, all types of non-woven fabric are suitable which meet the requirements in each case of the user of the load floor lining having integrated sound insulation. Also, injection moldable materials can be employed as bases.

As decorative materials there are employed for example needle punched non-woven fabrics which, because of their high resistance to abrasion, are well suited as decorative material in the load floor region. On the lower side, the cover flaps in the upper shell can additionally contain material parts which absorb airborne sound, as is illustrated in FIG. 2 for the cover flaps 10, 11 and 12.

For the absorption of airborne sound all known porous or fibrous materials are available, such as are known to the skilled person in this art. Additionally, the cover flaps may be given improved damping properties for airborne sound by means of direct lamination on them of acoustically effective heavy layers.

In the selection of the materials for the upper side of the upper shell 2, preferably a material is employed which makes possible a slip-free bearing of the load items, such as e.g. items of baggage.

The upper shell must (only) be able to stand up to the loading due to the carried load items and is permitted to deform under the load only in defined deflections. After de-loading this deformation must disappear again. Because of the very varied mechanical requirements on the upper shell (2) there is employed as material for example compressed cotton fiber non-woven fabric having a mass per unit area of 7.5 kg/m$^2$ with a phenol resin binder, which is advantageous for reasons of strength. In principle all materials generally used in automobile construction are suitable, whereby the selection is in general dependent upon the technical delivery conditions of the subsequent user. Materials such as e.g. wood or hard foam can also be employed. For reasons of recycling upon later disposal of the vehicle, there is however provided the employment of materials which are chemically composed as like one another as possible.

The upper shell 2 is per se configured in one piece and completely covers over the lower shell 1. With the employment of mechanically more resistant covering non-woven fabric as visible decorative surface the hinge means 3, 13, 14 and 15 are formed by the covering non-woven fabric itself. The arrangement and the opening direction of the hinge means is effected in accordance with purely pragmatic considerations. In many cases it is expedient to lay the opening direction for the cover flap 17 above the spare wheel 9 in the vehicle longitudinal direction because by these means in the case of partial loading the storage compartments remain well accessible. That, in the configuration of the upper shell 2, provision should be made for sufficient support areas in the lower shell is self-evident and therefore need not be discussed further in detail.

FIG. 2 shows as a sectional view a further exemplary embodiment of the load floor lining having integrated sound insulation.

Items in FIG. 2 similar to those in FIG. 1 are indicated by the same reference signs. In the exemplary embodiment of FIG. 2 in particular the upper shell 2 is provided in several parts in order to make possible separate access to the various storage compartments. Further, the lower shell 1 can also be provided in several parts, so that, e.g. regions which are subjected to particular external influences, such as e.g. in the vicinity of the exhaust 30, may be made of a special material. The spare wheel 9 is covered by the storage compartment 6, so that also the region of the rim of the spare wheel 9 is used as storage space. The accessability of the spare wheel can be ensured e.g. by means of opening the cover flap 11 and removal of the storage compartment 6. Alternatively, the spare wheel 9 can also be mounted under the trunk floor.

The inner side of the upper shell 2 and/or of the inner shell 1 may be provided with a lining which absorbs airborne sound, as is illustrated by means of the lining 31 on the cover flap 11. A cover flap 19 may be attached to another cover flap as shown in FIGS. 1 and 1a with a hinge means 3, or alternatively as shown in FIG. 2 a cover flap 10 can be attached to the lower shell 1 or to the trunk itself, with a hinge means 3. Further, from FIG. 2, expedient stiffening ribs 32 can be seen.

From FIG. 3, the surprisingly good acoustic effectiveness of the load floor lining in accordance with the invention is clear. There are illustrated three sound damping curves as a function of frequency. The two curves a and b are taken from European Patent Application 0 474 593 A1 and make it clear that the developments there brought about an improvement of the sound damping in the region of the ignition frequency of about between 125 and 250 Hz of up to 8 dB. This improvement relative to the so-called classical, conventional configuration having about 12 kg/m$^2$ mass per unit area was, however, achieved at the cost of significant disadvantages in the frequency range above 315 Hz, which there amount to up to 20 dB. This apparent from a comparison of curves a and b.

Alongside this there stands the data of curve 1 which was measured at the load floor lining in accordance with the present invention. With only ca. 9 kg/m$^2$ mass per unit area of the load floor lining there are provided significant improvements over all frequencies. The reasons for this lie in the overall double-shell configuration having relatively great hollow space depths in the storage compartments, in the range of 10 ccm and more. Further contributions to the overall effect are made by means of effective sealing of the upper shell against the lower shell, and by means of a lining below the upper shell which absorbs airborne sound, in concert with its increased airborne sound damping by means of corresponding acoustic strengthening of the upper shell material.

The control units for the active noise control are based upon the known state of the art, e.g. on U.S. Pat. No. 4,153,815; U.S. Pat. No. 4,417,098 and U.S. Pat. No. 4,490,841.

These units 16 can be accommodated in the storage compartments 4, 5, 6 and 7 and make possible in the case of integrated installation of the microphones 17, 18, e.g. in the upper shell 2, together with the loudspeakers 29, in particular those mounted in the rear region, a local noise reduction of the 2nd motor order, which has effect in many cases also on the forward seats of the driver and front-seat passenger. Storage compartments 4,5,6, and 7 may be formed with ventilation openings 28.

With expedient configuration of the load floor lining with integrated sound insulation, the control microphones 17, 17a, 18 may also be positioned in the vicinity of the driver and front-seat passenger because of the plug-in connections 27 provided in the lower shell, and can thus, together with the loudspeakers 29 mounted there, lead to a further improvement of noise comfort.

The invention is not restricted to the described examples, but can be adapted to the respective technical requirements in each case whilst retaining the features significant for the invention.

We claim:

1. Load floor lining for one of a rear region and a trunk region of a motor vehicle, comprising a substantially planar upper shell, and a lower shell configured to follow a contour of the one of the rear region and the trunk region, the upper shell being connected with the lower shell by a first hinge to form a double wall unit having a first closed hollow storage space and a load floor, and the double wall unit being ready for installation with in the motor vehicle;

wherein said lower shell is formed of at least one material selected from the group consisting of thermally moldable non-woven fabrics and injection moldable plastics, and an upper surface coating formed of an abrasion resistant decorative material; and wherein the upper shell is formed of a load resistant material and is provided with an outer surface coating formed of an abrasion resistant decorative material on an outer surface thereof, the outer surface defining the load floor and a sound absorbing material disposed on an under surface of the upper shell, the under surface disposed within the first closed hollow storage space and the sound absorbing material adapted to absorb airborne sound from within the first closed hollow storage space.

2. Load floor lining according to claim 1, wherein the upper shell comprises a first upper shell portion and a second upper shell portion, the first upper shell portion being connected by the first hinge to the lower shell and the second upper shell portion being connected by a second hinge to the first upper shell portion, and wherein the first upper shell portion and the second upper shell portion together with the contour-following configuration of the lower shell, form the first closed hollow storage space and a second closed hollow storage space, at least one of the first closed hollow storage space and the second closed hollow storage space being of varying depths.

3. Load floor lining according to claim 2, wherein the second upper shell portion and the second hinge are each formed of the same abrasion resistant decorative material.

4. Load floor lining according to claim 3 wherein the first hinge is aligned with a first hinge axis, and wherein the first hinge axis is substantially aligned with a longitudinal axis of the motor vehicle.

5. Load floor lining according to claim 3 wherein the first hinge is aligned with a first hinge axis, and wherein the first hinge axis is substantially perpendicular to a longitudinal axis of the motor vehicle.

6. Load floor lining according to claim 3 wherein the first hinge is aligned with a first hinge axis and the second hinge is aligned with a second hinge axis, and wherein the first hinge axis and the second hinge axis are substantially perpendicular.

7. Load floor lining according to claim 1 wherein said upper shell is formed of a load resistant material selected from the group consisting of compressed cotton fiber, non-woven fabric having a mass per unit area of 7.5 kg/m$^2$, wood and hard foam.

8. Load floor lining according to claim 1, wherein said load resistant material is at least one material selected from the group consisting of thermally moldable non-woven fabrics and injection moldable plastics.

9. Load floor lining according to claim 1, wherein said sound absorbing material comprises one of an acoustically effective sound dampening reinforcement, an acoustically effective sound dampening covering and a sound absorbing lining.

10. Load floor lining according to claim 1, further comprising a device for holding the upper shell in a hinged open position.

11. The Load floor lining of claim 2, wherein at least one of the first and the second closed hollow storage spaces is sized to receive an electronic control unit.

12. A vehicle comprising a load floor lining installed in one of a rear region and a trunk region thereof, the load floor lining comprising:

a substantially planar upper shell, and a lower shell configured to follow a contour of the one of the rear region and the trunk region, the upper shell being connected with the lower shell by a first hinge to form a double wall unit having a first closed hollow storage space and a load floor;

wherein said lower shell is formed of at least one material selected from the group consisting of thermally moldable non-woven fabrics and injection moldable plastics, and an upper surface coating formed of an abrasion resistant decorative material; and wherein the upper shell is formed of a load resistant material and is provided with an outer surface coating formed of an abrasion resistant decorative material on an outer surface thereof, the outer surface defining the load floor and a sound absorbing material disposed on an under surface of the upper shell, the under surface disposed within the first closed hollow storage space and the sound absorbing material adapted to absorb airborne sound from within the first closed hollow storage space.

13. Load floor lining for at least one of the rear region and trunk region of a motor vehicle, comprising a substantially planar upper shell, and a lower shell configured to follow the contour of the at least one rear region and trunk region, the upper shell being connected with the lower shell by a hinge to form a complete double wall unit ready for installation;

wherein the upper shell comprises at least one covering hingeable by a second hinge which, together with the contour-following configuration of the lower shell, forms closed hollow storage spaces of various depths; and further comprising an electronic control unit for active noise control in the vehicle accommodated in a storage space of the load floor lining, plug-in connections integrated into the load floor lining, and on-board loudspeakers connected via the plug-in connections.

14. Load floor lining according to claim 13, wherein microphones are connected to the control unit for active noise control and are positioned in driver and front-seat passenger regions of the vehicle.

15. Load floor lining according to claim 13, further comprising loudspeakers installed in addition to the on-board loudspeakers.

16. Load floor lining according to claim 13, wherein the plug-in connections are configured as a central unit integrated into the lower shell.

17. Load floor lining according to claim 13, wherein the storage compartment which contains the electronic control unit for active noise control is provided with ventilation openings.

\* \* \* \* \*